Feb. 23, 1937.  G. F. WIKLE  2,071,716
APPARATUS FOR MANUFACTURING TIRES
Filed May 31, 1935  6 Sheets-Sheet 1

INVENTOR.
GEORGE F. WIKLE
BY
ATTORNEY.

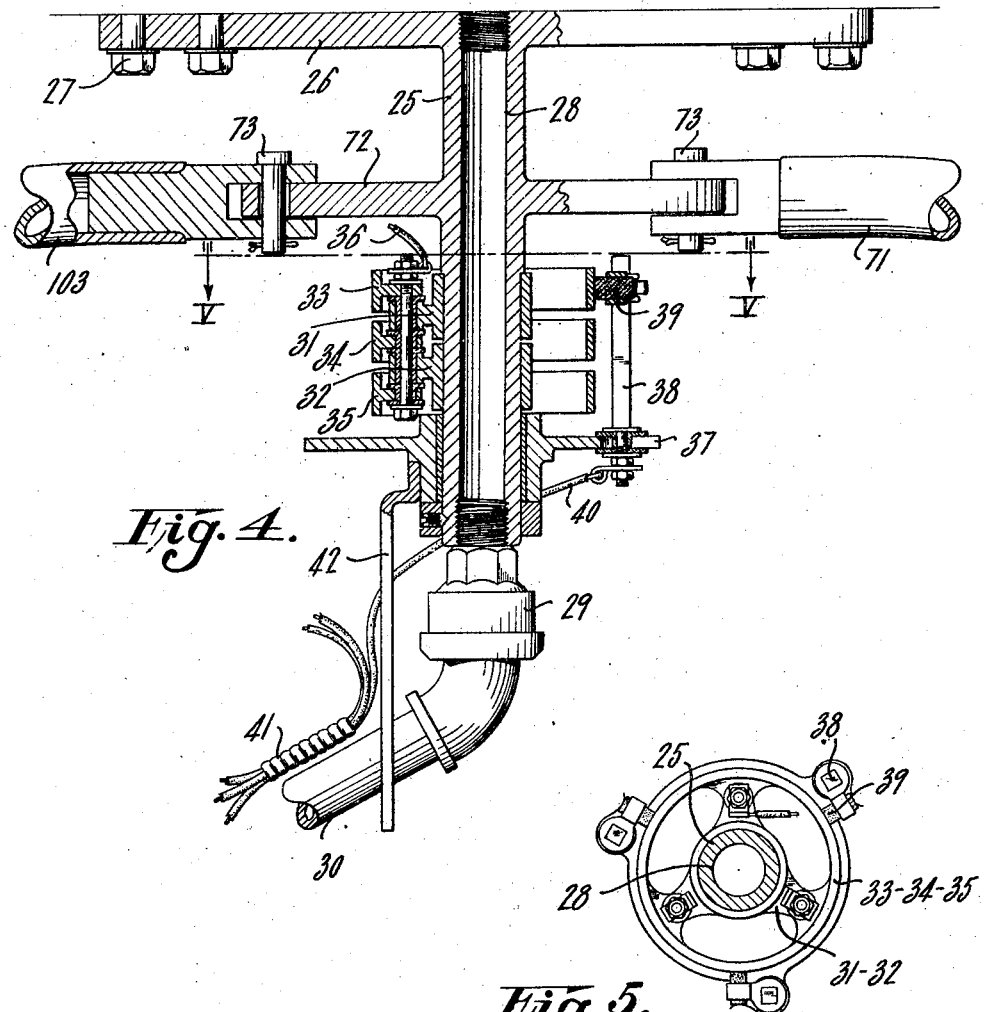
Fig. 4.
Fig. 5.
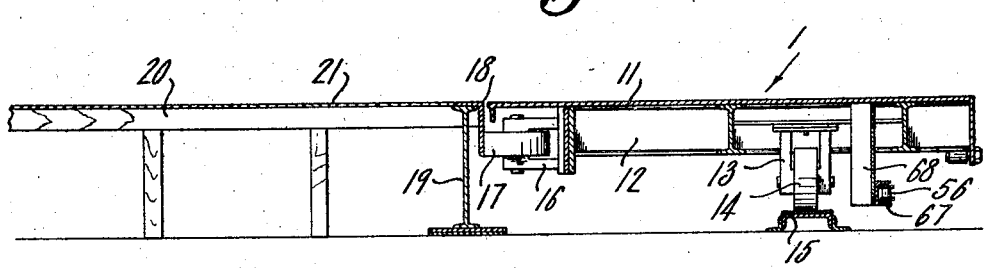
Fig. 3.
INVENTOR.
GEORGE F. WIKLE
BY
ATTORNEY.

Feb. 23, 1937.   G. F. WIKLE   2,071,716
APPARATUS FOR MANUFACTURING TIRES
Filed May 31, 1935   6 Sheets-Sheet 3
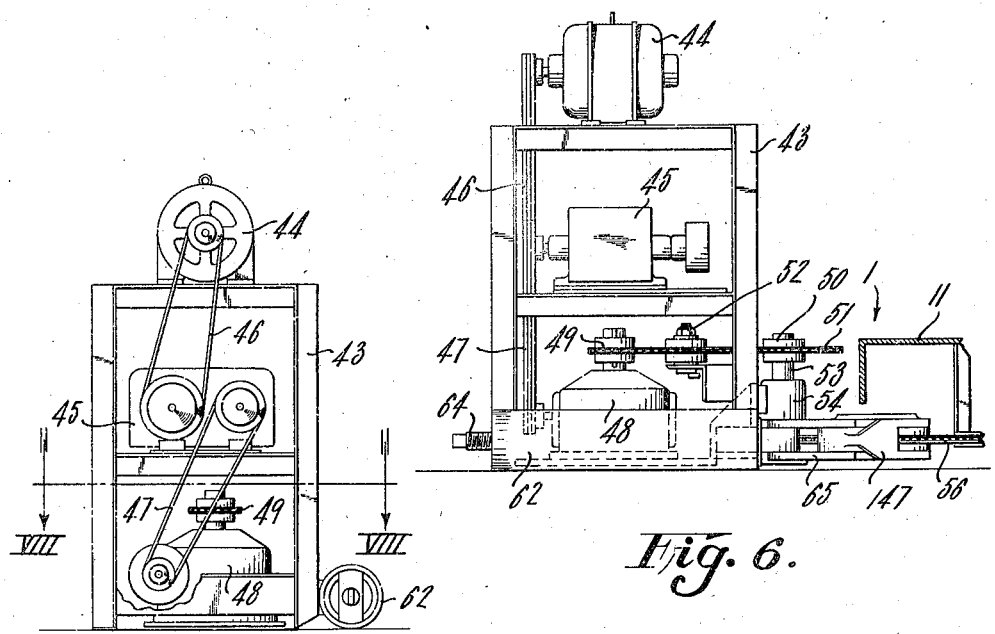
Fig. 6.
Fig. 7.
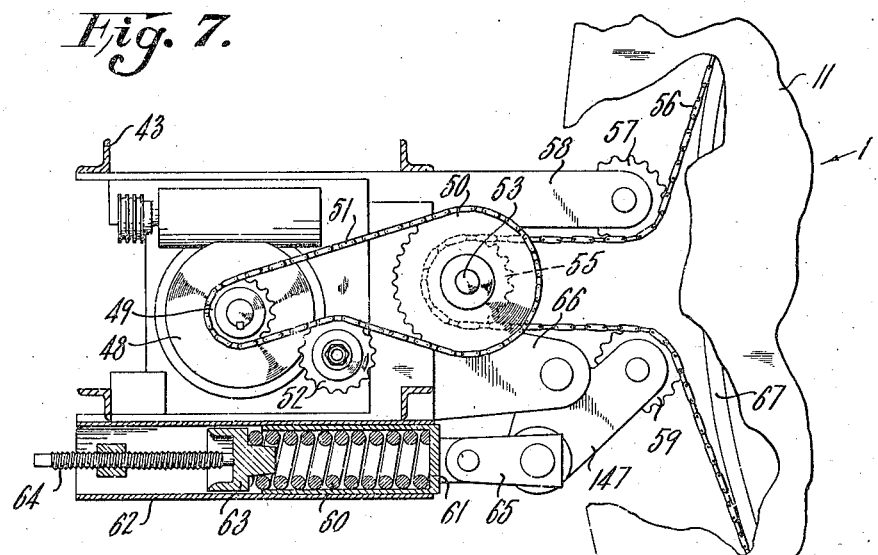
Fig. 8.
INVENTOR.
GEORGE F. WIKLE
BY
ATTORNEY.

Feb. 23, 1937.  G. F. WIKLE  2,071,716
APPARATUS FOR MANUFACTURING TIRES
Filed May 31, 1935   6 Sheets-Sheet 4
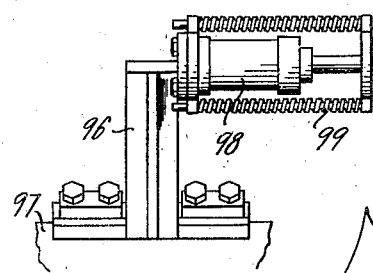
Fig. 12.
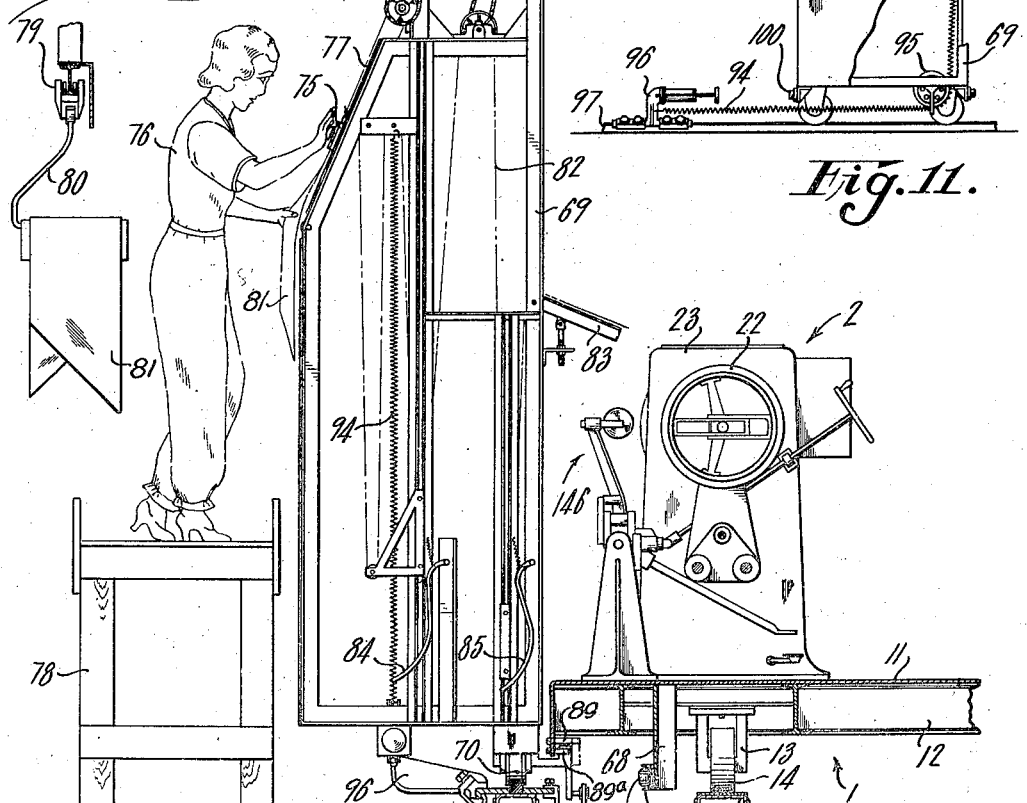
Fig. 11.
Fig. 9.
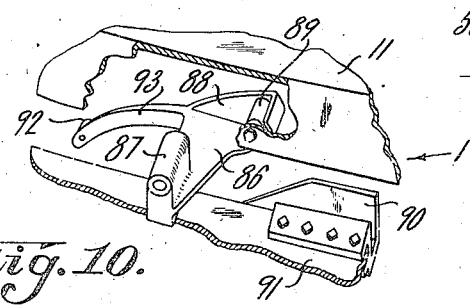
Fig. 10.
INVENTOR.
GEORGE F. WIKLE
BY
ATTORNEY.

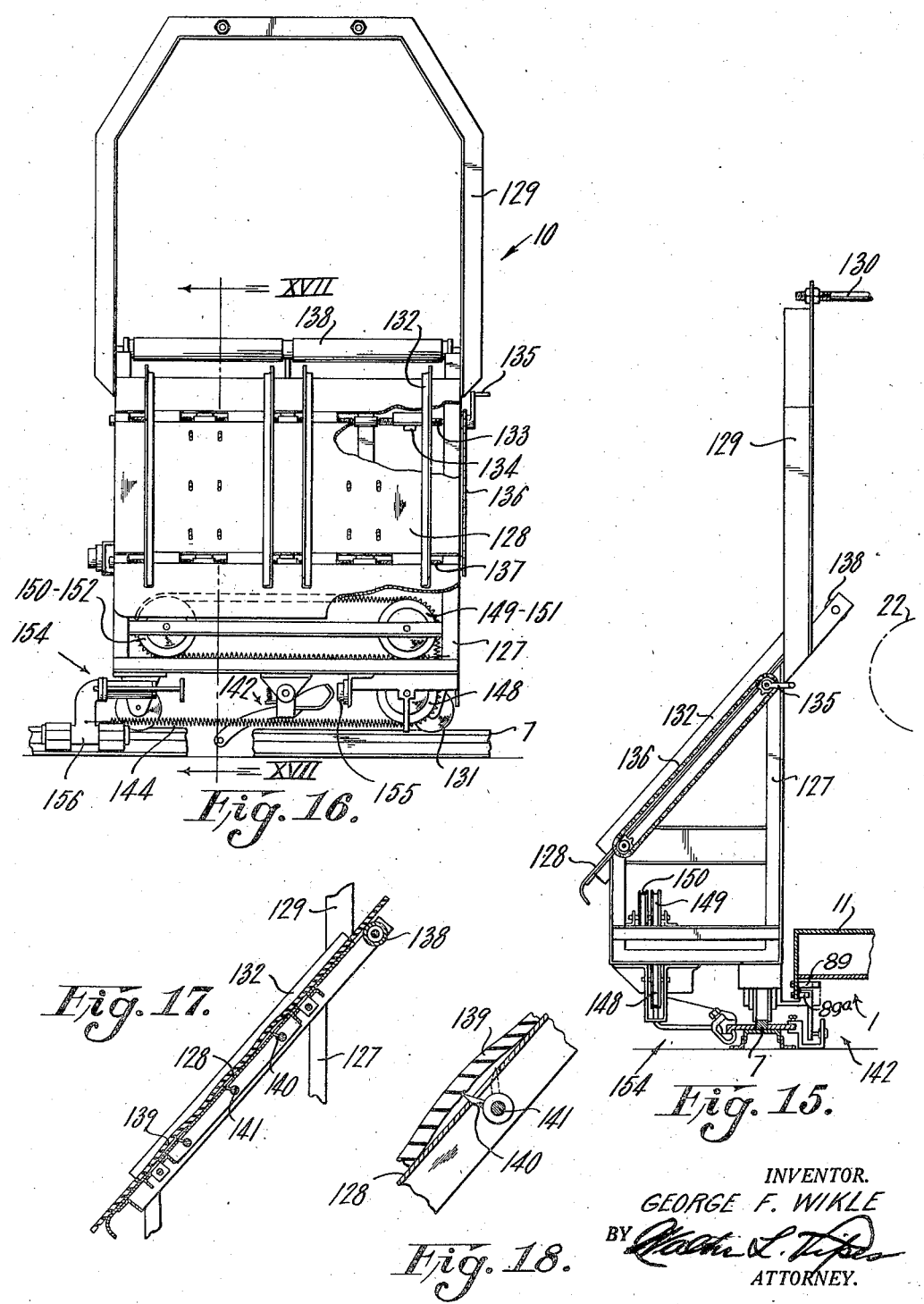

Patented Feb. 23, 1937

2,071,716

UNITED STATES PATENT OFFICE 2,071,716

APPARATUS FOR MANUFACTURING TIRES

George F. Wikle, Detroit, Mich., assignor to United States Rubber Products, Inc., New York, N. Y., a corporation of Delaware Application May 31, 1935, Serial No. 24,183

13 Claims. (Cl. 154—10)

In general, my invention relates to a conveyor method of building pneumatic tires, in which a plurality of tire building units are disposed about a circular rotatable table and adapted for complementary intermittent association with supply devices disposed adjacent to the rotatable table.

The present invention is an improvement on the structure described and claimed in Letters Patent No. 1,964,363, issued June 26, 1934 to Ostling et al.

In the present apparatus a continuous circular platform carries the tire building machines rather than having the machines mounted on separate bases, as is disclosed in Letters Patent No. 1,964,363. The use of a continuous platform lends safety to the operators as they are not called upon to step off and onto moving platforms. The circular shape of the platform provides a wider range in the disposition and movement of the adjacent supply apparatus than is possible with the arrangement found in the prior patent. The circular shape of the platform also permits it to be driven by a single enclosing chain.

In my apparatus the auxiliary supply devices rest on a single track and are supported at their tops by connections to a central support mounted in the ceiling. With this arrangement the supply devices may be made relatively narrow as compared with the width required where they rest on parallel rails, as disclosed in the prior patent. The central support also serves as an entrance for compressed air and electrical conductors, thereby eliminating the necessity for carrying an air compressor on the conveyor mechanism. In the present construction the return movement of each of the auxiliary supply apparatus is controlled by a long coiled spring to insure quick and uniform return movement. The return movement is also cushioned by an improved bumper.

These and other objects and advantages will appear more fully from the following detailed description, when considered in connection with the accompanying drawings, in which:—

Fig. 3 is a transverse view, in section, illustrating the structural features of the conveyor, taken along section lines III—III of Fig. 1;

Fig. 4 is a side elevational view, partially in section, of a central swivel support and power supply connection;

Fig. 5 is a transverse view, in section, taken along lines V—V of Fig. 4;

Fig. 6 is a side elevational view of the conveyor driving mechanism;

Fig. 7 is an end elevational view thereof;

Fig. 8 is a plan view, partly in section, of the conveyor driving mechanism;

Fig. 9 is a side elevational view of a fabric storage rack;

Fig. 10 is a perspective view, partly in section, illustrating connecting means between the storage rack and the conveyor;

Fig. 11 is a partial end view of the storage rack;

Fig. 12 is a side elevational view of a non-recoil bumper for cushioning the return impact of the storage rack;

Fig. 15 is a side elevational view of a tread supplying rack;

Fig. 16 is an end elevational view thereof;

Fig. 17 is a side view, in section, taken along lines XVII—XVII of Fig. 16; and

Fig. 18 is an enlarged view, in section, of the tread gripping means.

My invention contemplates the building or assembling of the various tire materials into a form generally referred to as a pulley band. The apparatus as herein set forth relates particularly to the building of a four-ply pneumatic tire, although it will be understood that various types of tires having a various number of plies may be built with equal efficiency within the scope of the invention.

In order that the various mechanisms of my invention may be understood in association with their various functions, I will describe briefly the commercial method followed in building a four-ply tire.

The first operation in the building of a four-ply tire comprises the wrapping of a layer of fabric around a building drum. This fabric layer is composed of parallel cords disposed diagonally in relation to the center of the ply, and is coated with a layer of rubber. The second ply comprises a similar layer of fabric, with the exception that it is applied with its cords disposed in reverse diagonal relation to the first ply. The edges of the two plies are stitched down, and bead wires encased in fabric are positioned in proper relation with the margins of the first two plies, and the edges of these two plies are turned upward around the bead wires. The second and third plies are next applied, each with its diagonal cords running in reverse relation relative to the next adjacent underlying ply.

The next operation is the application of a breaker strip, which forms a band around the center of the assembled plies; and the application of two so-called "chafer" strips, being narrow bands of fabric located near the marginal edges of the fabric plies. The tread is applied over these assembled plies. The edges of the second and third plies are turned down around the bead wires, and the tire building operation is complete.

Figure 1:
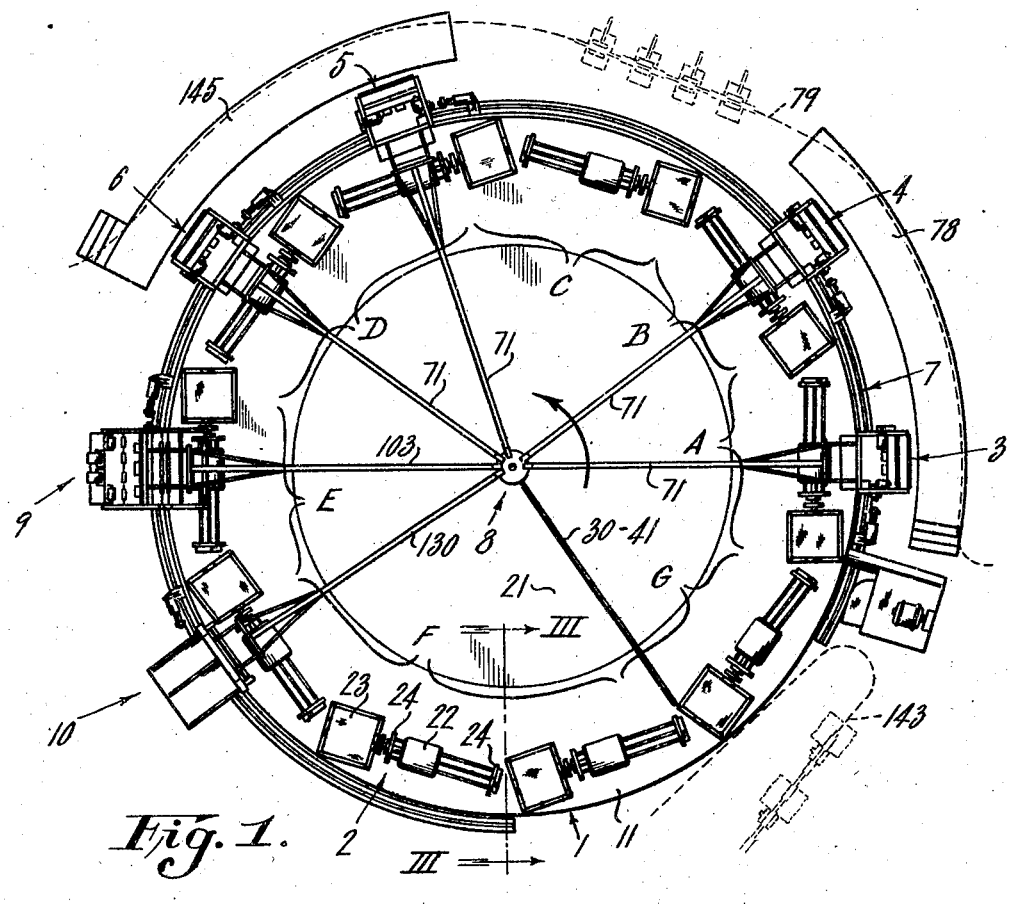
Fig. 1 is a plan view of an embodiment of my invention.
Figure 2:
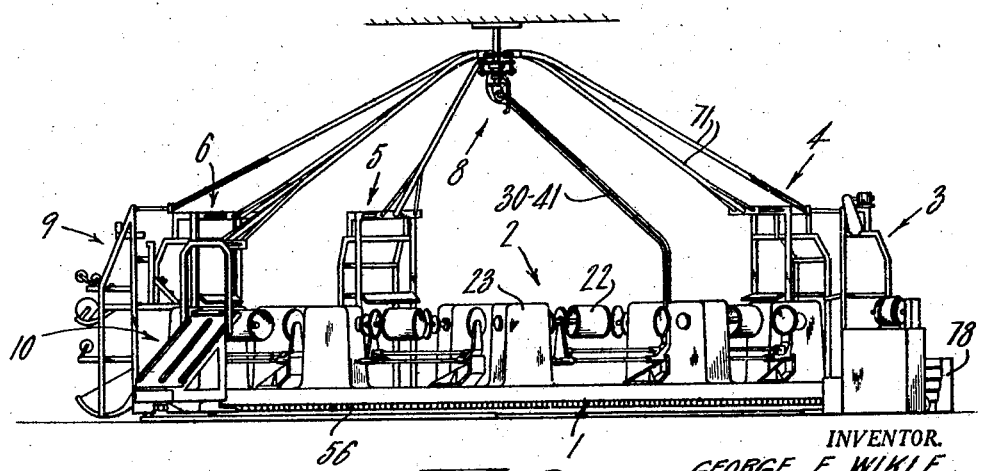
Fig. 2 is a side elevational view thereof.

Referring to the drawings, and in particular to Figs. 1 and 2, the apparatus comprises generally a circular rotatable platform 1, having mounted thereon a plurality of tire building units 2 equally spaced around the platform and mounted so that the drum of the building unit has its axis in tangential relation with a radial line on the circular platform. Specifically, I show ten complete tire building units 2.

Supply racks for the first, second, third, and fourth plies are represented by the numerals 3, 4, 5, and 6, respectively. Each of these racks is relatively narrow and rests upon a curved track 7, and is operable to move along with the conveyor platform for a predetermined distance until a quantity of fabric from the supply rack is transferred to a building drum, after which it returns to a position to be attached to the succeeding building drum. Each of the fabric supply racks is supported from a central pivot connection 8, thereby eliminating any need for a second supporting rail.

A breaker and chafer supply rack 9, and a tread supply rack 10, are also supported from the central pivot 8, and run on the track 7. These foregoing parts are the principal structures of the apparatus.

The rotatable platform 1 (Fig. 3) comprises a flooring 11 supported by a rigid structural framework 12, so that the operators remain on the same flooring while moving from machine to machine. As a whole, the circular platform is of rigid construction, and provides a movable surface of washer-like shape.

Depending from the structural framework 12 is a plurality of bifurcated brackets 13 supporting wheels 14 traveling on a circular track 15. Also, a plurality of bifurcated brackets 16 extending radially from the structural framework 12 on the inner side of the washer-like platform support horizontally disposed rollers 17 which engage with a circular track 18 supported by an I-beam 19. The track 18 is of angle section, and forms a marginal portion of a table 20 disposed within the opening formed by the washer-like circular platform 1.

The surface floor 21 of the table 20 is positioned in the same elevational plane as the floor 11 of the circular platform.

The tire building units positioned around the circular platform are of conventional type, comprising essentially a collapsible building drum 22, a housing 23, and bead setting rings 24 (Fig. 2).

As each housing 23 contains an electric motor for driving the building drum, and as the bead setting rings 24 are operable by fluid pressure, I provide the central pivot connection 8 (Fig. 4) with means for joining the rotatable and moving devices with sources of energy.

As shown in particular in Figs. 2 and 4, the central pivot connection unit 8 comprises a tubular member 25, having a flange 26 which is attached to a ceiling or other support by means of bolts 27. The tubular member 25 has an aperture 28 which operates to conduct the fluid pressure from its source of supply to a swivel connection 29, from whence a conduit 30 operates as a communicating means from the swivel joint 29 to one of the various tire building units 1. A piping connection (not shown) joins the various tire building units 1 with the lead-in conduit 30.

Means for conveying an electrical supply from a stationary source to a movable conveyor is also provided at the central connection 8. This includes a pair of brackets 31 and 32 rigidly attached to the tubular member 25, and operating to support a series of collector rings 33, 34, and 35. These rings are electrically insulated from the brackets 31 and 32, and being stationary may be readily connected as by wires 36 to a source of electrical supply. A flanged bracket 37, rotatable around the tubular member 25, carries a plurality of upright posts 38 which, in turn, support brushes 39 attached to the posts in such manner as to form under pressure a sliding contact with one of the collector rings 33, 34, or 35. The upright posts 38 are insulated from the flanged bracket 37, and an electrical wire 40 is connected to each of the posts and runs through a conduit 41. The conduit 41 follows along the fluid pressure conduit 30 to which it is attached, and to one of the building drum units from whence separate connections are made to each of the various tire building units.

An arm 42 attached to the hub of the flanged bracket 37 extends downwardly, and as the conduit 30 is carried around by the conveyor it bears against the arm 42 and causes the flanged bracket 37 to rotate with the movement of the conveyor.

*Conveyor drive*

The drive for the conveyor is shown in particular in Figs. 6, 7, and 8. A structural framework 43 supports a motor 44 and a reduction unit 45 which is driven from the motor 44 through a belt 46. Through a belt 47 the reduction unit 45, in turn, drives a second reduction unit 48. The reduction unit 48, through a horizontally disposed sprocket 49, drives a larger sprocket 50 through a chain 51. An idler sprocket 52 provides the necessary take-up and tension on the chain 51. The sprocket 50 is keyed to a shaft 53 rotatable in a bearing block 54 attached to the structural framework 43.

Also mounted on the shaft 53 is a main drive sprocket 55 with which the drive chain 56 encircling the conveyor is associated. An idler sprocket 57, supported by a bracket 58 extending from the structural framework 43, operates to position the chain 56 in proper relation with the conveyor. A second idler sprocket 59, which also positions the drive chain 56 in proper relation with the conveyor, is mounted so as to provide a tension on the drive chain 56.

The tension is provided by means of a spring 60 actuating within a piston 61 in a cylinder 62. A plunger 63 is adjustable to compress the spring 60 by means of a threaded rod 64. A link 65 is pivotally connected to the end of the piston 61, and also to the sprocket carrying arm 147. A bracket 66 attached to the structural framework 43 supports the arm 147 in pivotal relation in such manner that compression of the spring 60 operates to move the sprocket 59 toward the sprocket 57, thus tending to decrease the length of the drive chain 56 and provide the desired tension on the chain.

A track 67 with which the drive chain 56 engages comprises a circular channel attached to the conveyor platform by means of a plurality of brackets 68 (Fig. 3) extending therefrom.

*Ply storage devices*

As shown in Fig. 1, the ply storage devices 3, 4, 5, and 6 are positioned in different locations around the conveyor platform, and have for their purpose to carry a supply of ply fabric in a continuous strip available for application to the building drums.

The units 3, 4, 5, and 6 are similar, and are illustrated in particular by Figs. 9, 10, 11, and 12. Fig. 9 shows the position of the ply storage rack relative to the conveyor platform, and the building drum which the platform supports.

Generally, the storage rack comprises a structural framework 69 of box-like construction. This framework is supported by flanged wheels 70 riding on the single track 7. The upper portion of the structural framework 69 is supported by tubular members 71 extending to the overhead central pivot connection 8 (Figs. 2 and 4). The tubular member 25 of the central pivot connection 8 embodies a flange 72 to which the tubular supports 71 are attached in pivotal relation by means of pins 73. While the tubular supporting members 71 are not pivoted at the true central location of the entire unit, nevertheless they are sufficiently close that for practical purposes no difference is noted in the functional operation of the storage devices.

Other than the adaptation of a mounting suitable for the conveyor mechanism, the ply storage rack is of conventional type. It contains means for holding a supply of fabric stock by looping it up and down over rollers, so that stock may be fed into the unit and withdrawn therefrom without either the feeding or withdrawing operation affecting the other. The fabric plies are fed into the stock storage device by means of a power unit 74 controlled through an electric switch 75 actuated by an operator 76, who splices various pieces of stock 81 into a continuous length on the splicing table 77. An elevated platform 78 serves to place the operator at a convenient height for operating the mechanism.

An auxiliary conveyor 79 having hooks 80 moves slowly and continuously past the operator 76 so as to provide a continuous supply of strips of the stock 81. The strips of stock 81 are placed on the conveyor hooks 80 at a source such as a bias cutter (not shown). A series of these strips of fabric stock 81 are spliced together in a continuous length 82, the leading end of which rests on an inclined table 83 positioned for convenience of the tire building operator.

Arms 84 and 85 located near the lower end of the structural framework operate to make or break electrical contacts for the purpose of automatically maintaining the storage rack with a proper supply of stock.

At the proper time, when a building drum 22 is in alignment with the table 83 holding the leading end of the ply stock 82, the conveyor platform operates to engage the storage device to carry it along with the platform a predetermined distance, during which time a quantity of the stock 82 is transferred from the storage device to the building drum 22. The engaging mechanism between the conveyor platform and the storage device is shown in particular in Figs. 9 and 10.

A bracket 86 carries a hub 87 which is pivoted to the under-side of the structural framework 69 of the storage device. The bracket 86 contains a cup-like projection 88 extending underneath the conveyor platform, and operable for engagement with a lug 89 attached to the side of the conveyor platform. Thus, as the conveyor moves around, the lug 89 registers with the cup-like projection 88 and causes the storage device to move along with the conveyor.

At the proper time the storage device is released from engagement with the conveyor platform. This is effected by a cam 90 attached to a plate 91 extending from the track 7, and cooperating with a roller 92 projecting from an arm 93 forming part of the bracket 86. When the roller 92 engages with cam 90 the bracket 86 is swung on its pivot, thus releasing the cup-like projection 88 from engagement with the lug 89.

After the storage device is released from engagement with the conveyor platform it is returned to its starting position by the action of a coil spring 94 (Fig. 11). In order to cause the storage device on its return to move along at a substantially uniform rate, the coil spring 94 is of unusual length, necessitating its passing around a sheave 95 rotatably attached at the lower portion of the storage device. Thus, the coil spring 94 is attached to the upper portion of the structural framework 69 of the storage device, and extends downward around the sheave 95 to a bracket 96 attached to a plate 97 extending from the track 7. The bracket 96 also carries a non-recoil bumper which includes a cushioning cylinder 98 reinforced by compression springs 99. A rubber bumper 100 attached to the storage device forms a means of contact with the non-recoil bumper.

*Breaker and chafer supply device*

Figure 14:
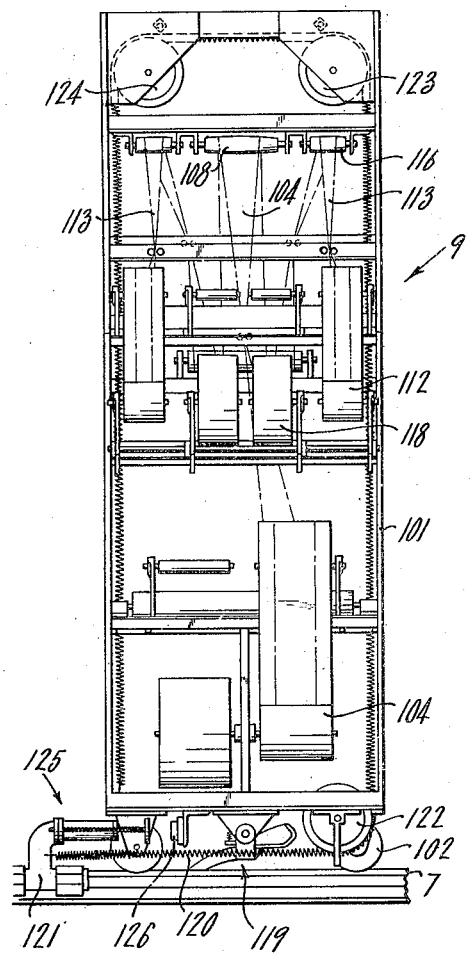
Fig. 14 is an end elevational view thereof.
Figure 13:
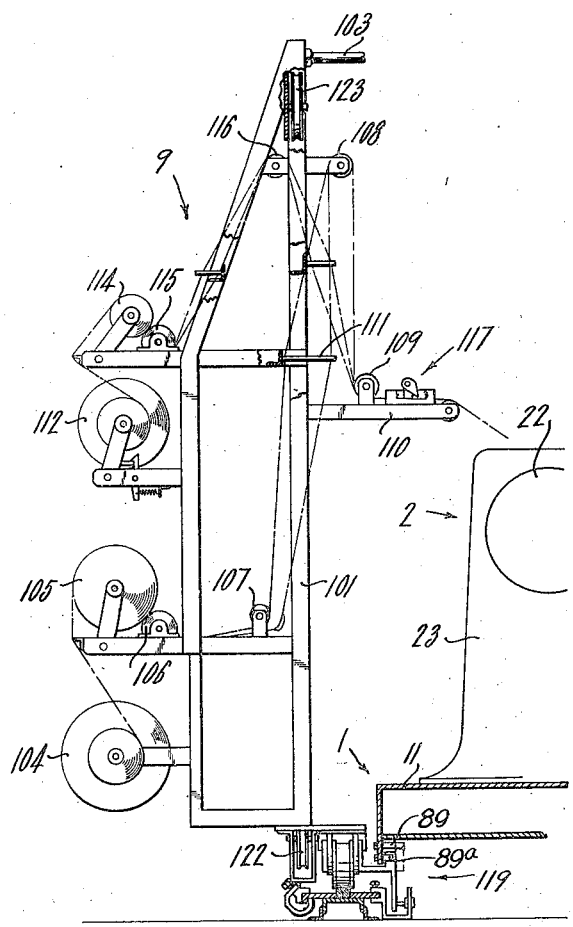
Fig. 13 is a side elevational view of a further storage rack for supplying narrow fabric strips.

Following the ply stock storage device units, particularly shown in Figs. 13 and 14, there is a stock storage unit for supplying breaker and chafing strips. This device 9 comprises a structural framework 101 resting on flanged wheels 102 movable along the track 7. A supporting member 103 extends from the uppermost part of the structural framework 101 to the pivotal center connection 8.

This supplying device consists merely of a rack for supporting various rolls of fabric, and for guiding them in their correct relation to the tire building drum 22. Specifically, the rack comprises means for holding a spool of fabric or breaker stock 104. This stock 104, which is wound between convolutions of a liner, is threaded upward around a roll 105 on to which the liner alone is wound, while the breaker stock itself passes around rollers 106, 107, 108, and 109 to the withdrawing tray 110 positioned near the building drum 22. The guide pins 111 positioned between the rollers 107 and 108 operate to move the stock from an off-center position to its correct central position. The purpose of placing the breaker rolls of stock in an off-center position is to permit the use of a double set of rolls so that when the fabric of one roll is exhausted it may be readily spliced on an adjacent full roll.

A set of chafing strip rolls 112 are positioned so that a strip of the chafing strip 113 will be available to the tire building operator, and so that a strip will be positioned near each side of the breaker strip. The chafing strip stock from the roll 112 passes upwardly around the liner roll 114, under roll 115, over roll 116, and under the roll 109. A ratchet device 117 operates to prevent return movement of either the breaker or chafing strips.

Like the breaker strip supply, additional rolls 118 of chafing strips are provided for ready splicing when the first rolls have become exhausted.

Similar to the ply storage device, the breaker and chafer supply device also carries a means 119 for engaging with the platform conveyor, and means for releasing its engagement. A return spring 120 attached to a bracket 121, similar to that shown in Fig. 12, passes around sheaves 122, 123, and 124. Coil spring 120 thus completely encircles the structural framework 101, and is attached at the lowermost portion of the framework. The purpose of making the spring 120 considerably longer than that which operates to return the ply stock storage device is because of the further travel of the breaker and chafer supplying device.

The breaker-chafer supply device also cooperates with a return non-recoil shock absorber 125 similar to that shown in Fig. 12. A bumper 126 attached to the under-side of the frame work 101 operates as a contacting means with the frame and the non-recoil shock absorber.

Tread supplying device

The tread supplying device, particularly shown in Figs. 15 to 18, comprises essentially a structural framework 127 supporting an inclined table 128 positioned in such manner that the upper portion of the inclined table is located relatively close to the building drum 22. Extension members 129 connect the structural framework 127 with a supporting rod 130 which, in turn, is connected to the central pivot 8. Like the preceding storage devices, the tread supplying rack is supported by flanged wheels 131 operable on the track 7.

Attached to the under-side of the framework 127 is a latch 142 for engaging and disengaging with the moving platform 1. This latch 142 is similar to that which is associated with the preceding storage device, and is shown in particular in Fig. 10, but as shown in Figs. 9, 13, and 15, the lugs 89 for the stock storing devices are longer than, and are offset relative to, the lugs 89ᵃ for positioning the tread supplying device. Also the lugs 89ᵃ may be staggered relative to succeeding drums so that tread stock may be drawn from alternate sides of the device by succeeding drums, as hereinafter explained.

In order to insure the proper return of the tread supplying device after its disengagement with the moving platform, I provide a long spring 144 attached to a bracket 156 extending from the track 7. This spring 144 passes around a sheave 148 and successively around sheaves 149, 150, 151, and 152, and is finally attached to the framework 127 at 153.

In order to cushion the stopping movement of the tread supplying device, I provide a non-recoil shock absorber 154, similar to that shown in Fig. 12. This shock absorber cooperates with the structural framework through a rubber bumper 155 extending from the structural framework 127.

The inclined table 128 has a capacity for two treads, and contains guiding means in the form of structural angles 132 for positioning the treads in their proper relation with the building drum. These guide angles 132 are adjustable for proper tread width by means of a threaded shaft 133 which cooperates with a threaded block 134 attached to each of the angles 132. The threaded shaft 133 contains right and left hand threads for varying the tread width guides. A crank 135 attached to the threaded shaft 133 serves as a means for manually operating the shaft. A chain 136 connects the upper threaded shaft 133 for simultaneous operation of the guide angles 132.

In order to assist the withdrawal of a tread from the supplying device, a roller 138 is positioned at the upper side of the inclined table 128. Fig. 17 shows a tread 139 positioned in its proper relation with the inclined table 128. Because the table 128 is inclined at a sharp angle, the tread 139 would ordinarily slide downward off the table. To overcome this I provide a series of bevelled points 140 extending through the table 128, and attached to a shaft 141 which is pivotally mounted on the structural framework 127. These pins 140 serve to prevent the tread from sliding downward, and when the tread is withdrawn from the rack these pins move forward as shown by the dotted lines in Fig. 18 to present their bevelled faces rather than their points to the tread stock. Thus, the pins 140 do not restrict movement of the tread as it is carried on toward the building drum.

Operation

In the operation of my invention, and as shown in Fig. 1, the conveyor platform is divided into seven zones, A to G, inclusive. Within these zones specific tire building operations are performed.

One tire builder or operator performs all of the operations necessary within zone A. For example, at this location, or starting point, operator A expands the collapsible drum 22 which was collapsed in the previous operation, and applies an adhesive to the surface of the drum so that tire fabrics will not slip or otherwise become displaced relative to the drum. Next, the conveyor platform in its counter-clockwise movement registers with the first ply storage device 3, whereby the storage device is carried along with the conveyor platform. During this interval operator A rotates the drum 22, while placing a layer of fabric therearound. The fabric stock is cut or torn on a line between its diagonally disposed cords, a short lap being allowed for splicing. This overlap is lightly patted to insure adhesion between ends of the ply. This completes the operation by tire builder A, whereupon he walks against the direction of the moving conveyor, and performs the same operation on the next oncoming building drum unit.

As the tire building unit moves into zone B, the conveyor platform registers with stock storage device 4, and at this station operator B transfers a second ply from the stock storage device 4 to the building drum 22. The second ply is laid over the first ply in such manner that the diagonal cords of the fabric extend substantially at right angles to the cords of the preceding ply. This ply is cut to proper length and spliced. Operator B engages mechanical stitchers 146 (such as shown in Fig. 9) usually associated with tire building drums, and causes the plies to be stitched down tightly, particularly at the shoulder regions of the drum. Operator B lastly presses a lever (not shown) for pneumatically operating the bead wire retaining rings 24 in such manner as to position the bead wires a short distance within the margins of the first and second plies. The bead wires are applied to the rings 24 in a preceding operation hereinafter described.

As the tire building unit passes into the next zone, operator C mechanically stitches the fabric of the bead wires on to the top of the second ply, leaving margins of the first and second ply extending outwardly of the bead wires. By manual operation tire builder C grasps a hand tool, rotates the drum 22, and spins the marginal portions of the first and second plies up and around the bead wires. This same operation causes the marginal portions of the plies to be stitched in firm relation with the bead wires.

At this point the tire building unit leaves zone C, and enters zone D where the moving platform picks up the third ply fabric storage device 5.

Operator D causes a layer of fabric to be transferred from the storage device 5 to the building drum 22, and on top of the second ply and the bead wires. As soon as the third ply is laid, severed from its source, and spliced, the conveyor platform releases the stock storage device 5 and engages with the fourth ply storage device 6. In like manner operator D transfers a layer of fabric from the storage device 6 to the building drum, thus completing the operations in zone D, and finishing the ply laying operations.

As the building unit moves into zone E, the conveyor platform engages the breaker and chafer storage device 9. Operator E causes three strips of fabric to be withdrawn simultaneously from the storage device 9, and spliced on top of the fourth ply. These strips comprise a breaker which is laid around the center or crown of the carcass, and two narrow strips of fabric laid around the drum at a point between the breaker and the edges of the plies. These latter strips are generally referred to as chafer, or chafing strips.

As the storage device 9 is released from engagement with the conveyor platform, it returns to its original position, and the conveyor moves on into zone F. Immediately, the conveyor platform engages with the tread supplying device 10 and moves same along with the conveyor. The operator within zone F transfers a tread from supplying device 10 and lays it around the drum on top of the previously laid plies of fabric. The operator joins the ends of the tread, and while slowly rotating the drum pats the tread down in adhesion with the underlying fabric. The same operator causes the entire assembly of tire building materials to be stitched together by a machine stitching operation, over the entire surface of the carcass. This operator next, by a manual operation, spins the third and fourth plies down and under the bead wires. The operator next collapses the building drum and loosens the carcass from the surface of the drum, thus completing the operation in zone F.

The operations in zone F are such that it is preferable for a single operator to complete all the operations within that zone. Consequently, more than one operator is needed. Specifically, I find that three operators are required within zone F. Each operator in this zone, upon completing his task, returns to another tire building unit as it enters zone F, and follows that unit until it passes into zone G.

The last zone, or zone G, contains a single operator whose duty is to remove the tire from the building drum and dispose of it in some manner, as by placing it on an auxiliary conveyor 143 located adjacent to the platform conveyor at this point. Having thus completed a tire, operator G also prepares the unit for the next operation by positioning bead wires on the bead wire mounting rings 24. Thus, the tire building unit leaves zone G and continues onward in another cycle of operation.

Besides the tire building operators in the various zones A to G inclusive, it is necessary for other operators to supply various stocks in the storage units. For example, as shown in Figs. 1 and 9, operator 76 serves to supply stock to the first and second ply storage devices 3 and 4, respectively. As shown in Fig. 1, the auxiliary conveyor 79 passes along the edge of the platform so that operator 76 can remove stock therefrom and feed same into either storage devices 3 or 4. In a similar manner an arcuate platform 145 is positioned adjacent to the third and fourth ply storage devices 5 and 6, respectively. A single operator on this platform removes stock from the auxiliary conveyor 79 which also borders the platform 145, and feeds same into either of the storage devices 5 or 6.

An additional operator is required to replenish rolls of stock in the breaker and chafer storage device 9. The same operator also has among his tasks to maintain treads in position on the tread supplying device 10.

It will be noted that the tread supplying device 10 has a capacity for two treads, and when a tread is withdrawn from the supplying device it is necessary that it be in alignment with a building drum. This alignment provision is effected by the staggered registering lugs 89ª between the moving conveyor platform and the tread device 10. In other words, the registering means operates to alternately place one or the other of the treads in alignment with the building drum. Thus, the operator for supplying the treads to the tread device insures that a new tread will be in its proper place on the supplying device, and according to the alternate registration of the tread supplying device with the building drum.

From the foregoing disclosure, certain obvious advantages now become apparent. For example, the use of a continuous moving platform on which the operator walks lends safety to the function of the apparatus and stability in its unitary construction.

The use of narrow festoons or storage devices supported from a single track and braced from a central pivot adds to the compactness of the entire unit and to the smoothness of its operation.

The long coil springs in combination with the shock absorbers for positioning the various storage devices assist in the quiet and accurate operation of these mechanisms.

The central pivotal connection providing means for supplying electrical energy and fluid pressure reduces energy supply connections to a minimum.

The true circular shape of the conveyor platform enables a wider range of adjustability of the various storage devices relative to the moving platform. Also, the stationary circular table within and flush with the moving platform provides a desirable feature in safety, and further provides a convenient storage space for such tire components as bead rings.

In addition to the foregoing advantages, the various zones in which operators perform specific tasks may be readily enlarged or narrowed, according to the nature and length of time required to perform individual operations. Furthermore, the relation of the operator's task within a specified zone is sufficiently variable that one operator may perform all the operations within the designated zone, or two or more operators may alternately carry on the same operation in an enlarged zone. Or, further, a single operator may remain at one unit throughout its entire cycle of operation.

While I have thus shown and described a present preferred embodiment of my invention, it will be readily understood that other modifications may be made therein without departing from the spirit of the invention and the scope of the appended claims.

Having thus described my invention what I claim and desire to protect by Letters Patent is:

1. A tire building mechanism comprising a conveyor having a plurality of tire building machines carried thereby, a supporting track mounted exteriorly of and substantially parallel to the conveyor, an anchoring means disposed above the conveyor, a plurality of machines resting on said track for supplying component parts of a tire, connecting means between the anchoring means and the supplying machines, and means for causing said tire building machines to successively co-operate with said supplying machines during continuous movements for tire forming operations and for then causing their separation.

2. A tire building mechanism comprising a circular platform, means for moving the platform, a plurality of tire building machines carried by the platform, a track mounted externally of the platform, an anchor disposed centrally of the platform, a plurality of machines for supplying component parts of the tire supported by said track, means for connecting said supplying machines to the anchor for supporting them, and means for causing said supplying machines to successively co-operate with said tire building machines for continuous movement therewith during the tire forming operations and for then causing their separation.

3. A tire building mechanism comprising a circular platform, means for moving the platform, a plurality of tire building machines carried by the platform, a single rail mounted externally of the platform, an anchor disposed centrally of the platform, a plurality of machines for supplying component parts of the tire supported by said rail, means for connecting said supplying machines to the anchor for supporting them, and means for causing said supplying machines to successively co-operate with said tire building machines for continuous movement therewith during tire forming operations and for then causing their separation.

4. A tire building mechanism comprising a circular platform, means for moving the platform, a plurality of tire building machines carried by the platform, a single rail mounted externally, an anchor disposed centrally of the platform, a plurality of machines for supplying component parts of the tire supported by said rail, means for connecting said supplying machines to the anchor for supporting them, means for causing said supplying machines to successively co-operate with said tire building machines for continuous movement therewith during tire forming operations and for then causing their separation and means for returning the supplying machines to their initial positions between their successive supplying operations.

5. A tire building mechanism comprising a circular platform, means for moving the platform, a plurality of tire building machines carried by the platform, a track mounted externally of the platform, an anchor disposed centrally of and above the platform, a plurality of machines for supplying component parts of the tire supported by said track, means for connecting said supplying machines to the anchor for supporting them, and means for causing said supplying machines to successively co-operate with said tire building machines for continuous movement therewith during tire forming operations and for then causing their separation.

6. A tire building mechanism comprising a circular platform, means for moving the platform, a plurality of tire building machines carried by the platform, a single rail mounted externally of the platform, an anchor disposed centrally of and above the platform, a plurality of machines for supplying component parts of the tire supported by said rail, means for connecting said supplying machines to the anchor for supporting them, and means for causing said supplying machines to successively co-operate with said tire building machines for continuous movement therewith during tire forming operations and for then causing their separation.

7. In a tire building mechanism a conveyor, means for moving the conveyor in an endless path, tire building machines mounted thereon, and each comprising electrically and pneumatically actuated apparatus, a base mounted within the outline of the conveyor and having means for supplying electrical energy and fluid under pressure, and movable connections between said base and at least one of said tire building machines whereby the electrical energy and fluid under pressure are transmitted from said base to at least one of said tire building machines.

8. In a tire building mechanism, a circular platform, means for moving the platform in an endless path, tire building machines mounted thereon and each comprising electrically and pneumatically actuated apparatus, a base mounted centrally of the platform and having means for supplying electrical energy and fluid under pressure, and movable connections between said base and at least one of said tire building machines whereby the electrical energy and fluid under pressure are transmitted from said base to at least one of said tire building machines.

9. In a tire building mechanism, a circular platform, means for moving the platform in an endless path, tire building machines mounted thereon and each comprising electrically and pneumatically actuated apparatus, a base mounted centrally of and above the platform and having means for supplying electrical energy and fluid under pressure, and movable connections between said base and at least one of said tire building machines whereby the electrical energy and fluid under pressure are transmitted from said base to at least one of said tire building machines.

10. In a tire building machine a moving conveyor, a plurality of tire building machines mounted thereon, a machine for supplying a component part of a tire movably mounted externally of the conveyor, means for temporarily connecting the supplying machine to the conveyor to furnish material to said tire building machine during the movement thereof, means for disconnecting the supplying machine, and means comprising a long coiled spring for returning the supplying machine to its initial position after being released from the conveyor.

11. In a tire building machine a moving conveyor, a plurality of tire building machines mounted thereon, a machine for supplying a component part of a tire movably mounted externally of the conveyor, means for temporarily connecting the supplying machine to the conveyor to furnish material to said tire building machine during the movement thereof, means for disconnecting the supplying machine, and means comprising a long coiled spring in part housed in said supplying machine, for returning the supplying machine to its initial position after being released from the conveyor.

12. In a tire building machine a moving conveyor, a plurality of tire building machines mounted thereon, a machine for supplying a component part of a tire movably mounted externally of the conveyor, means for temporarily connecting the supplying machine to the conveyor to furnish material to said tire building machine during the movement thereof, means for disconnecting the supplying machine, means comprising a long coiled spring for returning the supplying machine to its initial position after being released from the conveyor, and a non-recoil bumper for stopping the return movement of said supplying machine.

13. In a tire building machine a moving conveyor, a plurality of tire building machines mounted thereon, a machine for supplying a component part of a tire movably mounted externally of the conveyor, means for temporarily connecting the supplying machine to the conveyor to furnish material to said tire building machine during the movement thereof, means for disconnecting the supplying machine, means comprising a long coiled spring, in part housed in said supplying machine, for returning the supplying machine to its initial position after being released from the conveyor, and a non-recoil bumper for stopping the return movement of said supplying machine.

GEORGE F. WIKLE.